(12) United States Patent
Yamagishi et al.

(10) Patent No.: US 8,294,847 B2
(45) Date of Patent: Oct. 23, 2012

(54) OPTICAL UNIT, BACKLIGHT DEVICE, LIQUID CRYSTAL MODULE AND LIQUID CRYSTAL DISPLAY APPARATUS

(75) Inventors: Nobuyoshi Yamagishi, Yokohama (JP); Shigehiro Masuji, Yokohama (JP); Naoto Hirohata, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 145 days.

(21) Appl. No.: 12/661,320

(22) Filed: Mar. 15, 2010

(65) Prior Publication Data

US 2010/0238378 A1    Sep. 23, 2010

(30) Foreign Application Priority Data

Mar. 18, 2009  (JP) .................................. 2009-065855

(51) Int. Cl.
*G02F 1/13357* (2006.01)
(52) U.S. Cl. ........................... 349/64; 362/331; 362/607
(58) Field of Classification Search ................... 349/62, 349/64; 362/97.2
See application file for complete search history.

(56) References Cited

U.S. PATENT DOCUMENTS

| 6,151,166 A | 11/2000 | Matsushita et al. | 359/566 |
| 2008/0130279 A1* | 6/2008 | Hsu et al. | 362/246 |

FOREIGN PATENT DOCUMENTS

| CN | 1680849 A | * 10/2005 |
| EP | 1 674 893 | 6/2006 |
| JP | 2008-003243 | 1/2008 |

OTHER PUBLICATIONS

European Extended Search Report (dated Jun. 14, 2010-6 pages).

* cited by examiner

*Primary Examiner* — Sarah Hahm
(74) *Attorney, Agent, or Firm* — Renner, Kenner, Greive, Bobak, Taylor & Weber

(57) ABSTRACT

An optical unit for use in a backlight device of a liquid crystal display apparatus, includes a light-diffusing component to diffract incident light and a light-collecting component having multiple microlenses each having a shape of a hemisphere- or semi-oval-like protrusion on a light-emitting side of the light-collecting component. The components are provided in this order on an optical path of light emitted from a light source of the backlight device. The light-diffusing component includes a diffusing section having a first surface that faces the light source and an opposite second surface, and first and second prisms provided on the first and second surfaces, respectively. Each prism has a cross section like a teeth of a saw. Each first prism has a summit protruding towards the light source. Each second prism has a summit protruding in an opposite direction of the first prism.

2 Claims, 16 Drawing Sheets

OPTICAL UNIT, BACKLIGHT DEVICE, LIQUID CRYSTAL MODULE AND LIQUID CRYSTAL DISPLAY APPARATUS

CROSS-REFERENCE TO RELATED APPLICATIONS

This application is based on and claims the benefit of priority from the prior Japanese Patent Application No. 2009-065855 filed on Mar. 18, 2009, the entire contents of which is incorporated herein by reference.

BACKGROUND OF THE INVENTION

The present invention relates to an optical unit, a backlight device, a liquid crystal module and a liquid crystal display apparatus, with improvements in luminance uniformity.

Liquid crystal display apparatuses have been advanced with a larger and thinner display screen. A larger display screen for such display apparatuses, however, requires improvements in luminance uniformity that is degraded over a large screen which is referred to as luminance non-uniformity, hereinafter.

One of the major factors in the screen luminance non-uniformity is non-uniform luminance distribution of light of a backlight device, one of the components of a liquid crystal display apparatus, that illuminates a liquid crystal display panel.

An improved backlight device for a liquid crystal display apparatus with reduced luminance non-uniformity in a large display screen is described, for example, in Japanese Un-examined Patent Publication No. 2008-003243 (referred to as Citation 1, hereinafter).

The backlight device described in Citation 1 is installed in the back of a liquid crystal display panel, equipped with a light source, a light diffusing plate, a first light diffusing sheet, a light collecting sheet, a second light diffusing sheet, aligned in this order.

A unit constituted by the light diffusing plate, the first light diffusing sheet, the light collecting sheet, and the second light diffusing sheet is referred to as an optical unit, hereinafter.

Light beams emitted from the light sources are diffused by the light diffusing plate and the first light diffusing sheet and then collected by the light collecting sheet while being diffracted in a direction orthogonal to the light collecting sheet. The collected light beams are then emitted from the light collecting sheet, with enhanced luminance in a certain range of view angle. The light emitted from the light collecting is incident on the second light diffusing sheet to undergo diffusion to have higher luminance uniformity.

A thinner liquid crystal display apparatus requires a shorter distance (referred to as optical-unit distance, hereinafter) between the light source and the light diffusing plate, when it employs the backlight device of Citation 1. A typical optical-unit distance is about 15 mm in known liquid crystal display apparatuses.

An optical-unit distance shorter than 15 mm, however, causes a bigger difference in luminance between the section just above (in front of) the light source and the other sections with respect to the light diffusing plate. Such a difference in luminance results in luminance non-uniformity of illuminating light emitted from the backlight device.

One solution to such a problem is providing additional several optical sheets to the optical unit, which, however, causes cost-up and decrease in luminance.

Another solution to such a problem is providing more light sources while maintaining sufficient luminance. Providing more light sources, however, leads to increase in circuit components in a driver for the liquid crystal display panel, such as an inverter (not shown), which results in cost-up and higher power consumption.

The above two solutions improve luminance uniformity for illuminating light emitted in a direction orthogonal to the backlight device whereas do not improve luminance uniformity sufficiently for illuminating light emitted in the other directions.

More optical sheets and/or light sources are required to improve luminance uniformity for illuminating light emitted in the other directions discussed above, which are, however, not practical solutions.

SUMMARY OF THE INVENTION

A purpose of the present invention is to provide an optical unit, a backlight device, a liquid crystal module, and a liquid crystal display apparatus that achieve sufficient luminance for a large liquid crystal display panel with reduced luminance non-uniformity.

Another purpose of the present invention is to provide an optical unit, a backlight device, a liquid crystal module, and a liquid crystal display apparatus that achieve sufficient luminance for a thin liquid crystal display panel with reduced luminance non-uniformity, with no increase in the number of light sources.

Still, another purpose of the present invention is to provide an optical unit, a backlight device, a liquid crystal module, and a liquid crystal display apparatus, with reduced luminance non-uniformity in the direction orthogonal to a backlight device and also oblique directions.

The present invention provides an optical unit for use in a backlight device of a liquid crystal display apparatus, comprising: a light-diffusing component to diffract incident light; and a first light-collecting component having a plurality of microlenses each having a shape of a hemisphere- or semi-oval-like protrusion on a light-emitting side of the first light-collecting component, wherein the light-diffusing component and the first light-collecting component are provided in this order on an optical path of light emitted from a light source of the backlight device, and the light-diffusing component includes: a light diffusing section having a first surface that faces the light source and an opposite second surface; a first prism section provided on the first surface, having a plurality of prisms each having a cross section like a teeth of a saw and a summit protruding towards the light source; and a second prism section provided on the second surface, having a plurality of prisms each having a cross section like a teeth of a saw and a summit protruding in an opposite direction of each prism of the first prism section.

Moreover, the present invention provides a backlight device for use in a liquid crystal display apparatus comprising: an optical unit; a reflecting plate; and a light source provided between the optical unit and the reflecting plate, wherein the optical unit includes: a light-diffusing component to diffract incident light; and a light-collecting component having a plurality of microlenses each having a shape of a hemisphere- or semi-oval-like protrusion on a light-emitting side of the light-collecting component, wherein the light-diffusing component and the light-collecting component are provided in this order on an optical path of light emitted from the light source, and the light-diffusing component includes: a light diffusing section having a first surface that faces the light source and an opposite second surface; a first prism section provided on the first surface, having a plurality of prisms each having a cross section like a teeth of a saw and a summit protruding towards the light source; and a second prism section provided on the second surface, having a plurality of prisms each having a cross section like a teeth of a saw and a summit protruding in an opposite direction of each prism of the first prism section.

Furthermore, the present invention provides a liquid crystal module for use in a liquid crystal display apparatus comprising: a liquid crystal display panel; an optical unit, a light source; and a reflecting plate, the light source being provided between the reflecting plate and the optical unit so that the reflecting plate, the light source, and the optical unit constitute a backlight device for illuminating the liquid crystal display panel, wherein the optical unit includes: a light-diffusing component to diffract incident light; and a light-collecting component having a plurality of microlenses each having a shape of a hemisphere- or semi-oval-like protrusion on a light-emitting side of the light-collecting component, wherein the light-diffusing component and the light-collecting component are provided in this order on an optical path of light emitted from the light source, and the light-diffusing component includes: a light diffusing section having a first surface that faces the light source and an opposite second surface; a first prism section provided on the first surface, having a plurality of prisms each having a cross section like a teeth of a saw and a summit protruding towards the light source; and a second prism section provided on the second surface, having a plurality of prisms each having a cross section like a teeth of a saw and a summit protruding in an opposite direction of each prism of the first prism section.

Still, furthermore, the present invention provides a liquid crystal display apparatus comprising: a liquid crystal module; and a driver for driving the liquid crystal module, wherein the liquid crystal module includes: a liquid crystal display panel; an optical unit, a light source; and a reflecting plate, the light source being provided between the reflecting plate and the optical unit so that the reflecting plate, the light source, and the optical unit constitute a backlight device for illuminating the liquid crystal display panel, wherein the optical unit includes: a light-diffusing component to diffract incident light; and a light-collecting component having a plurality of microlenses each having a shape of a hemisphere- or semi-oval-like protrusion on a light-emitting side of the light-collecting component, wherein the light-diffusing component and the light-collecting component are provided in this order on an optical path of light emitted from the light source, and the light-diffusing component includes: a light diffusing section having a first surface that faces the light source and an opposite second surface; a first prism section provided on the first surface, having a plurality of prisms each having a cross section like a teeth of a saw and a summit protruding towards the light source; and a second prism section provided on the second surface, having a plurality of prisms each having a cross section like a teeth of a saw and a summit protruding in an opposite direction of each prism of the first prism section.

DETAILED DESCRIPTION OF PREFERRED EMBODIMENTS

Preferred embodiments of an optical unit, a backlight device, a liquid crystal module, and a liquid crystal display apparatus according to the present invention will be described with reference to drawings.

In the following disclosure and throughout the drawings, the same or analogous elements or components are given the same numerals or signs, overlapping description being omitted if not necessary. Moreover, the drawings schematically illustrate a basic principle of the present invention in out-of-scale proportions.

Figure 1:
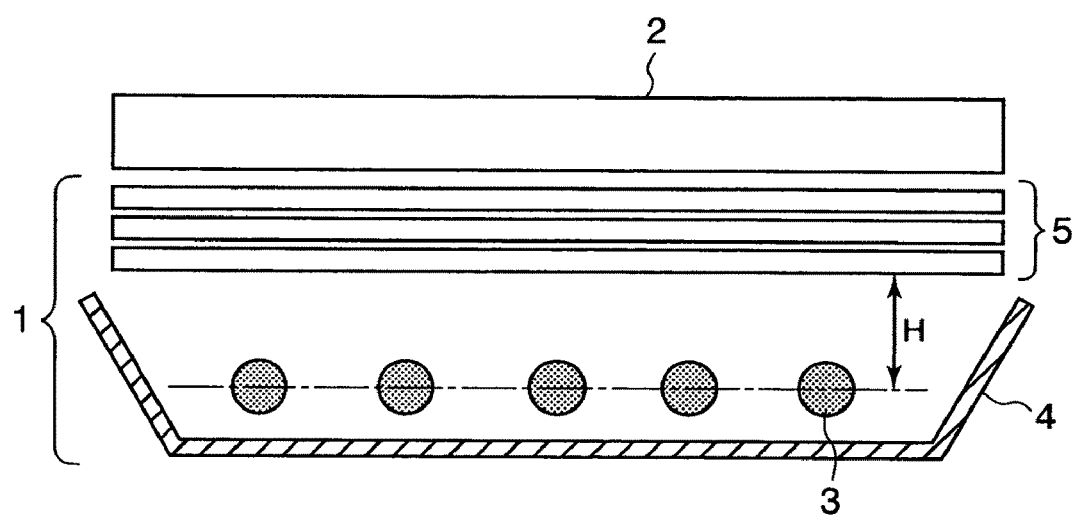
FIG. 1 shows a sectional view of a basic structure of a backlight device, according to the present invention, for illuminating a liquid crystal panel.

As shown in FIG. 1, a backlight device 1, according to the present invention, for illuminating a liquid crystal display panel 2, is equipped with: light sources 3, a reflecting plate 4 that reflects light emitted in a direction opposite to the display panel 2 to make the light return to the display panel 2; and an optical unit 5, provided between the light sources 3 and the display panel 2, having several plate- or sheet optical components that function to improve a display performance of the display panel 2.

The liquid crystal display panel 2 is provided with polarization films on its light-incident and -emitting sides, that allow a first linearly polarized light (P-polarized light, for example) to pass therethrough whereas absorbs a second linearly polarized light (S-polarized light, for example) that is orthogonal to the first linearly polarized light.

In FIG. 1, the distance between the center line (indicated by a long-dashed and short-dashed line) of the light sources 3 and the section of the optical unit 5 closest to the light sources 3 is referred to as an optical-unit distance H, hereinafter.

Figure 2:
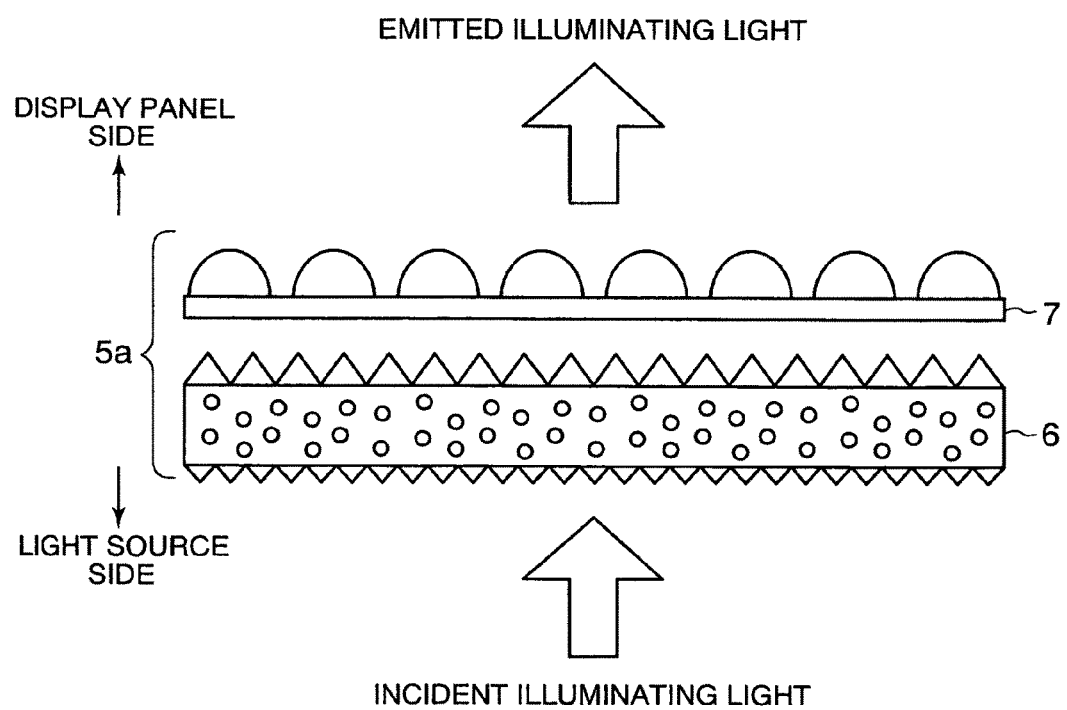
FIG. 2 shows an exploded sectional view of a first embodiment of an optical unit according to the present invention.

An optical unit 5a (a first embodiment) shown in FIG. 2 is installed between the light sources 3 and the liquid crystal display panel 2, with a specific optical distance H from the light sources 3.

[First Embodiment of Optical Unit]

Described with reference to FIG. 2 is an optical unit 5a that achieves reduction of luminance non-uniformity of light emitted to the liquid crystal display panel 2 (FIG. 1), as a first preferred embodiment of the present invention.

The term "luminance non-uniformity" is defined as in-plane non-uniformity of luminance of light emitted to a display zone of the liquid crystal display panel 2, in the present invention.

As shown in FIG. 2, the optical unit 5a is equipped with: a prism-equipped diffusing plate 6 having prisms formed on the light-incident and -emitting sides of the plate 6; and a first microlens-equipped optical sheet 7, as a first light collecting component.

Figure 3:
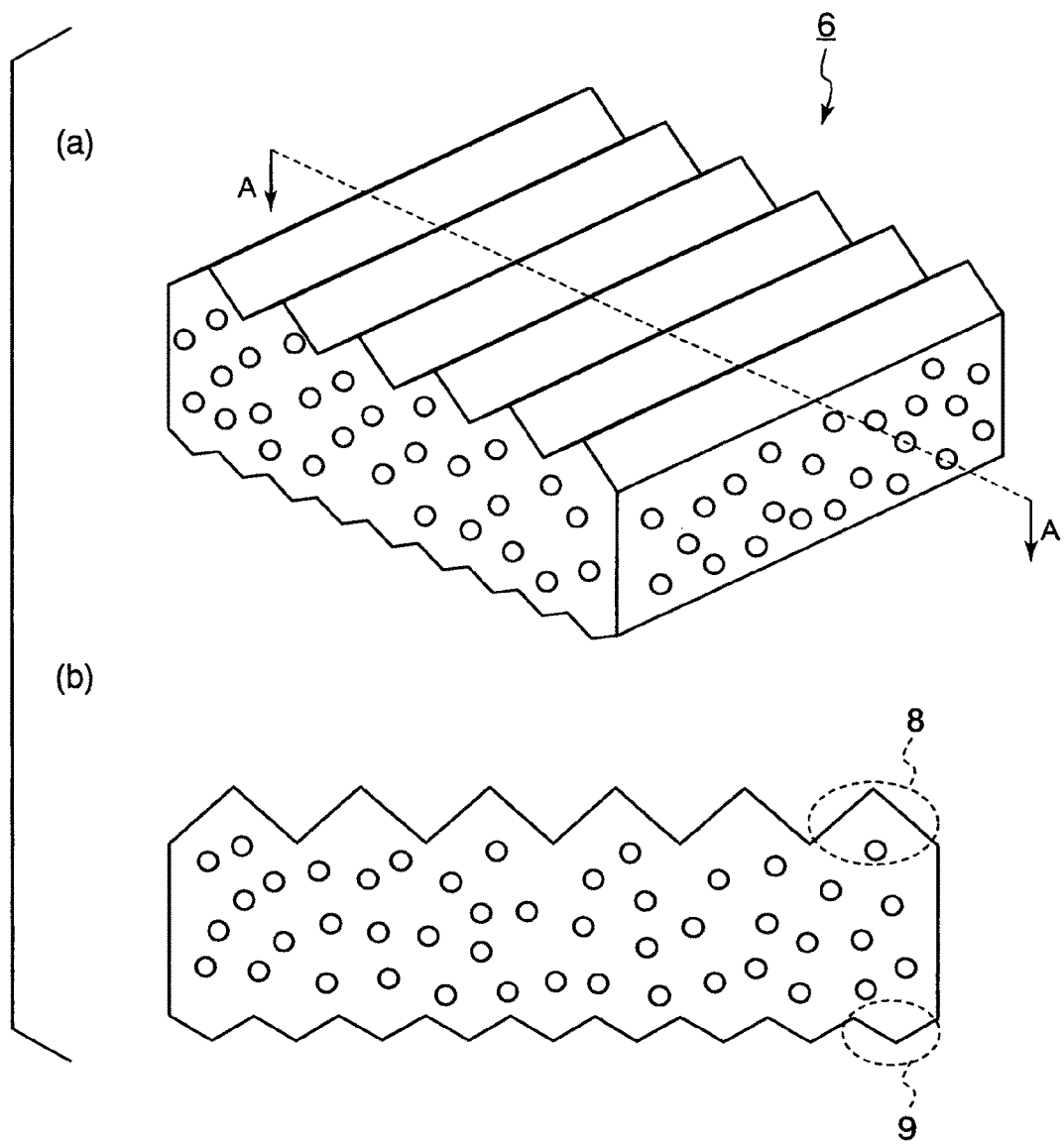
FIG. 3 shows a prism-equipped diffusing plate used in an optical unit according to the present invention, in which (a) shows a partial perspective view of the diffusing plate and (b) shows a partial sectional view of the diffusing plate, taken on line A-A in (a)

As shown in (a) and (b) of FIG. 3, the prism-equipped diffusing plate 6 has multiple prisms formed integrally with a sheet base (a light diffusing section) on the light-incident and -emitting sides of the base.

The prism-equipped diffusing plate 6 is made of a material that is a transparent resin with a light diffusing agent dispersed in the resin or a mixture of at least two types of resin which are hardly mixed with each other. The transmittance and haze level of the diffusing plate 6 can be adjusted by varying the amount of the light diffusing agent or the mixture ratio of the resins. The diffusing plate 6 made of such material achieves higher luminance uniformity by diffusing the light emitted from the light sources 3 and also the light reflected by the reflecting plate 4 (FIG. 1).

A first prism section 8 of the prism-equipped diffusing plate 6, formed on the light-emitting side of the sheet base, has multiple prisms, each indicated by a dot-line circle in (b) of FIG. 3, having a cross section like the teeth of a saw and formed as being parallel to one another with a constant interval for their summits and protruding from the light-emitting side of the sheet base.

A second prism section 9 of the prism-equipped diffusing plate 6, formed on the light-incident side of the sheet base, also has multiple prisms, each indicated by a dot-line circle in (b) of FIG. 3, having a cross section like the teeth of a saw and formed as being parallel to one another with a constant interval for their summits and protruding from the light-incident side of the sheet base.

The prism-equipped diffusing plate 6 having the first and second prism sections 8 and 9 with different intervals between their prisms reduces moiré pattern interference which could occur on the backlight device 1 (FIG. 1).

The illuminating light emitted from the light sources 3 (FIG. 1) is incident on the second prism section 9 of the prism-equipped diffusing plate 6 and diffracted in the direction orthogonal to the slope of each prism of the prism section 9 so that all of the beams of the illuminating light are directed in the direction towards the first microlens-equipped optical sheet 7 (FIG. 2), or the liquid crystal display panel 2 (FIG. 1).

When the illuminating light is diffracted so that it is directed in the direction towards the liquid crystal display panel 2, this is referred to as light collection, hereinafter, occasionally.

The illuminating light incident on the prism-equipped diffusing plate 6 is diffused while passing through the diffusing plate 6 and is then incident on the first prism section 8.

Among the beams of the illuminating light incident on the first prism section 8, those incident at a specific angle are diffracted in the direction orthogonal to the prism-equipped diffusing plate 6 and collected when emitted from the diffusing plate 6. On the contrary, the other beams incident on the first prism section 8 at other angles return to the second prism section 9 in which they are diffused several times. The diffused beams are incident on the sheet base of the diffusing plate 6 and diffused again several times and emitted therefrom towards the light sources 3 (FIG. 1).

The illuminating light emitted from the prism-equipped diffusing plate 6 is incident on the prism-equipped light collecting sheet 7 (FIG. 2).

Figure 4:
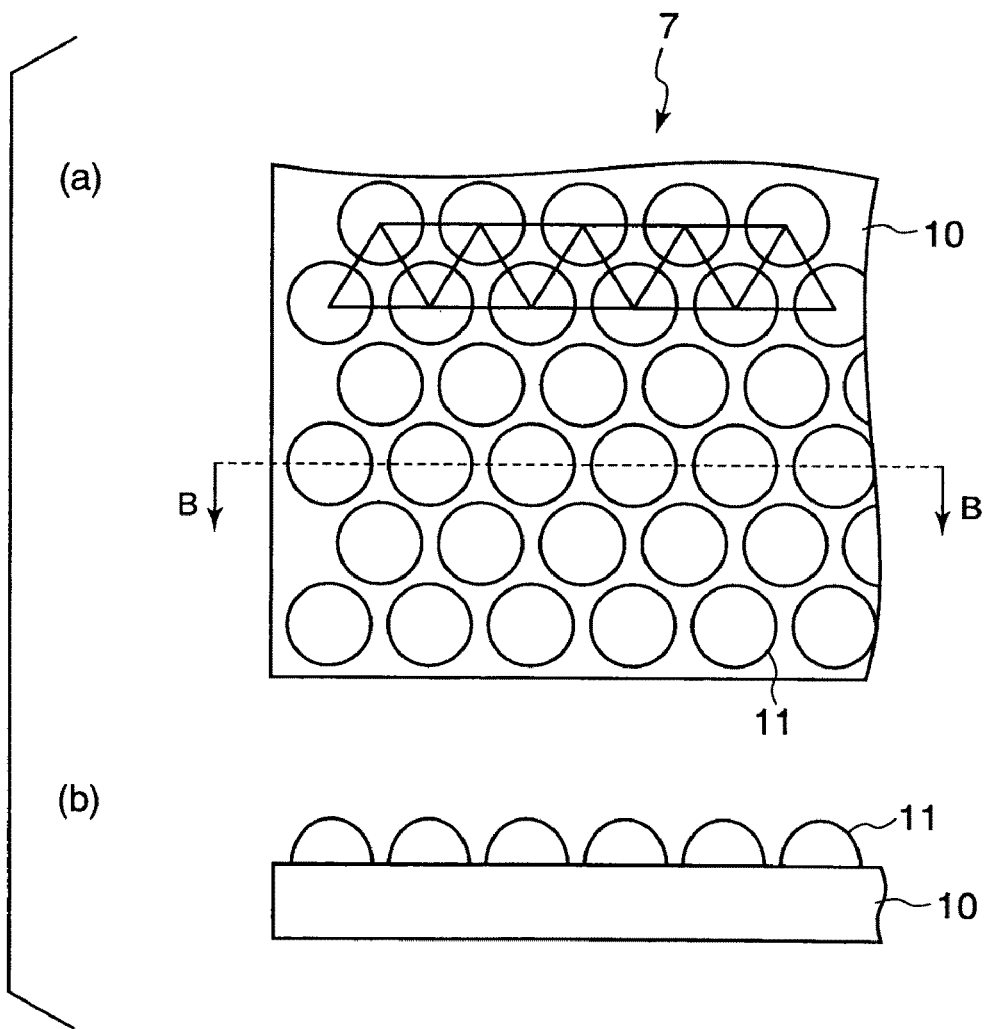
FIG. 4 shows a prism-equipped light collecting sheet used in an optical unit according to the present invention, in which (a) shows a partial plan view of the collecting sheet and (b) shows a partial sectional view of the collecting sheet, taken on line B-B in (a)

As shown in FIG. 4, the first prism-equipped light collecting sheet 7 is provided with multiple microlenses 11 two-dimensionally arranged on the light-emitting side of a sheet base 10. Each microlens 11 has a shape of a hemisphere- or semi-oval-like protrusion.

The sheet base 10 and the microlenses 11 are made of a material that exhibits high transmittance to allow incident light to pass therethrough. The material may be applied with a diffusing agent for control of light distribution. Moreover, the sheet base 9 and the microlenses 10 are preferably made of the same material that can restrict reflection at the interface therebetween due to difference in refractive index, which otherwise occurs if different materials are used.

The first microlens-equipped optical sheet 7 has several optical functions, such as, light collection, reflection in a direction of the normal line of the sheet 7 and diffusion.

The microlenses 11 are tightly arranged on the sheet base 10. It is preferable that the microlenses 11 are tightly arranged on the sheet base 10 with almost no gaps therebetween for maximum light collecting and diffusion performances.

A preferable arrangement of the microlenses 11 is a grid pattern, as shown in (a) of FIG. 4, in which imaginary lines connected to the summits of each set of three microlenses 11 form an equilateral triangle.

Figure 5:
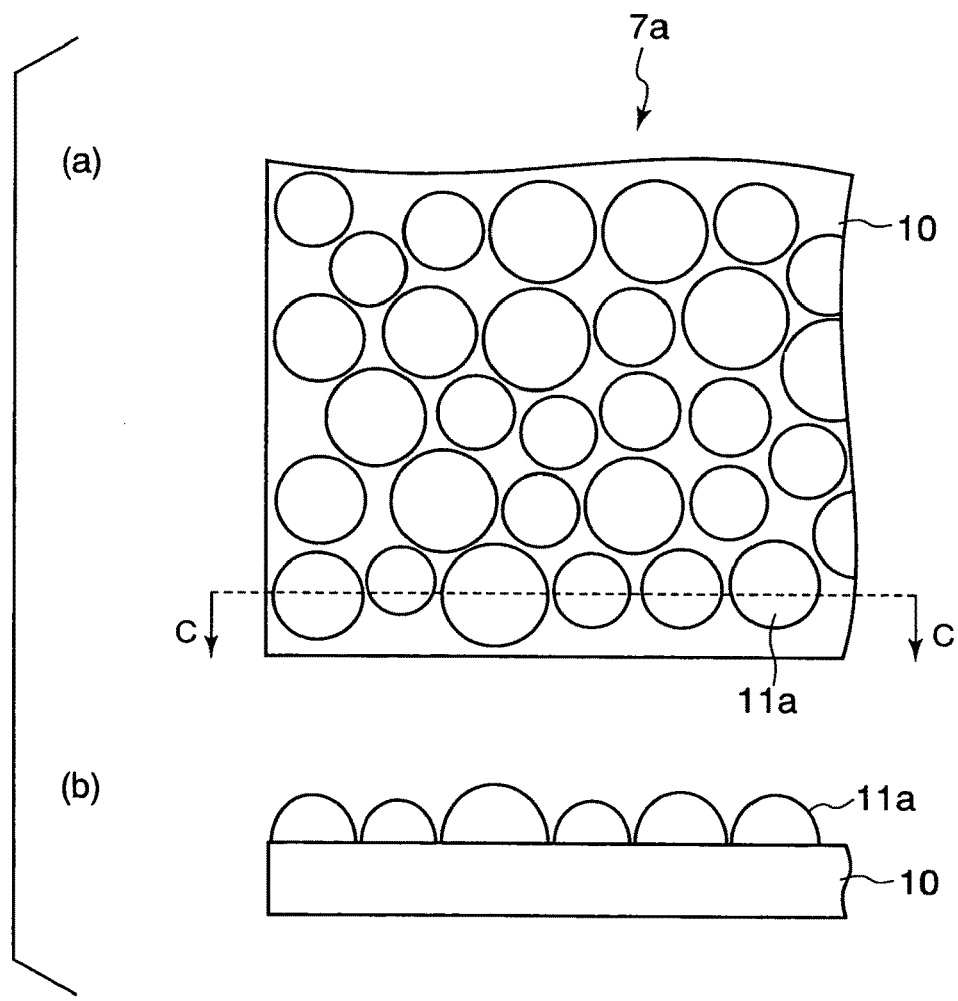
FIG. 5 shows a prism-equipped light collecting sheet used in an optical unit according to the present invention, in which (a) shows a partial plan view of the collecting sheet and (b) shows a partial sectional view of the collecting sheet, taken on line C-C in (a)

A more preferable arrangement of the microlenses is that, as shown in (a) of FIG. 5, microlenses 11a of a microlens-equipped optical sheet 7a have different diameters for their surfaces that are in contact with the sheet base 10, when viewed from the light-emitting side of the microlenses 11a. This arrangement has a random grid pattern of imaginary lines connected to the summits of the adjoining microlenses 11a, which prevents a moiré pattern from being observed due to the laminated structure of the microlens-equipped optical sheet 7a with the other optical components, as shown in FIGS. 1 and 2.

The arrangement of the microlenses 11 of the first microlens-equipped optical sheet 7 may have different arrangement patterns.

Discussed next is the optical path for the illuminating light, emitted from each light source 3 (FIG. 1), that passes through the optical unit 5a (FIG. 2), the first embodiment of the present invention.

The light sources 3 of the backlight device 1 shown in FIG. 1 are generally tube-like light sources, which cause luminance non-uniformity and variation in the angle of incidence of light on the light-incident surface of the optical unit 5a due to the locations of the light sources 3, the difference in the light directly incident on the optical unit 5a and the light incident thereon after reflected by the reflecting plate 4, etc.

The light beams incident on the prism-equipped diffusing plate 6 from the light sources 3, that exhibit luminance non-uniformity and variation in the angle of incidence, are diffracted by the first and second prism sections 8 and 9, and collected to be emitted from the diffusing plate 6. In detail, the light beams incident on the diffusing plate 6 at a specific angle are collected as being closer to the direction orthogonal to the diffusing plate 6 whereas the other light beams are reflected in the diffusing plate 6 several times and then return in the direction towards the light sources 3.

The light beams emitted from the prism-equipped diffusing plate 6 are incident on the first microlens-equipped optical sheet 7 and then allowed to pass therethrough to be emitted in the direction towards the liquid crystal display panel 2, as collected illuminating light with lowered luminance non-uniformity.

The light collecting function of the first and second prism sections 8 and 9 of the prism-equipped diffusing plate 6 serves to uniformly emit the illuminating light with wide angle of incidence from the diffusing plate 6 in the direction towards the liquid crystal display panel 2.

Therefore, the optical unit 5a, the first embodiment of the present invention, can be provided near the tube-like light sources 3 than the known optical unit that suffers luminance non-uniformity, thus the present invention achieves a thinner backlight device and a thinner liquid crystal display using the backlight device.

As an option, a diffusing sheet having a function of diffusing incident light may be provided between the light sources 3 and prism-equipped diffusing plate 6.

[Second Embodiment of Optical Unit]

Figure 6:
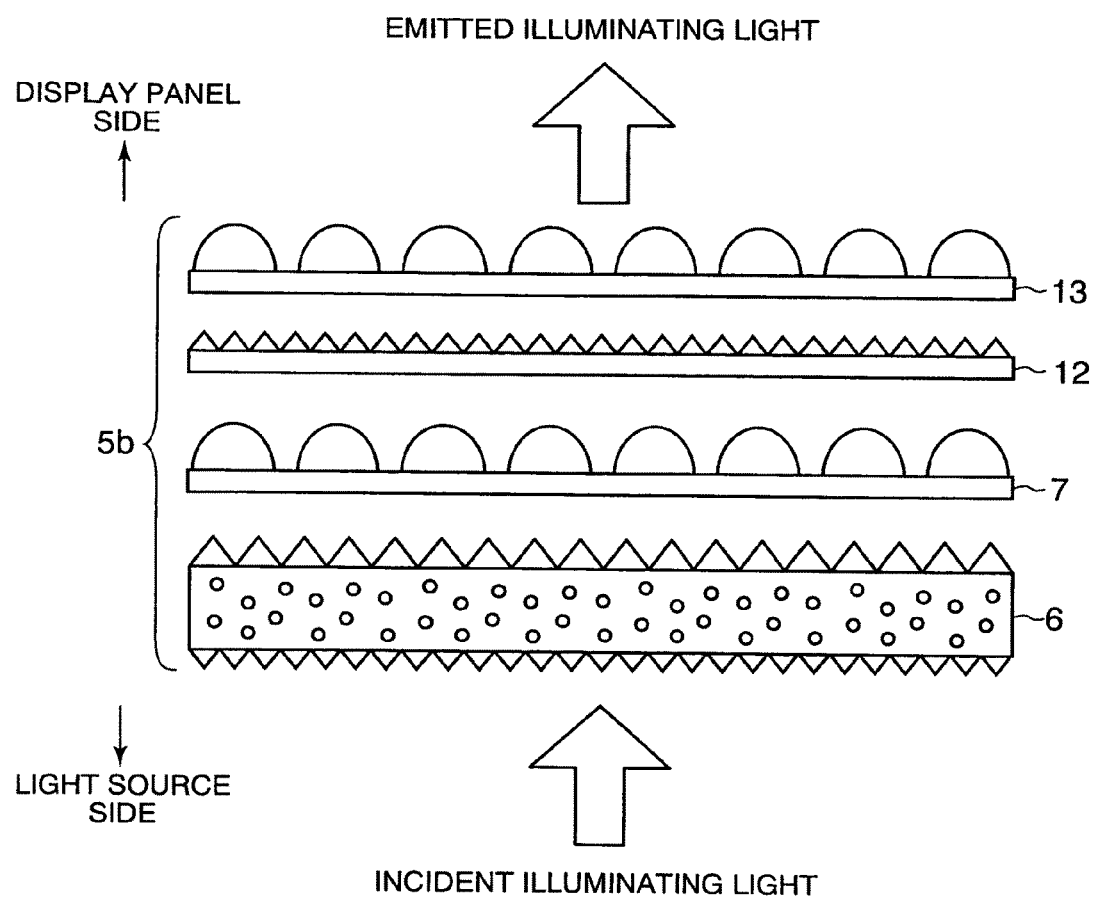
FIG. 6 shows an exploded sectional view of a second embodiment of an optical unit according to the present invention.

Described with reference to FIG. 6 is an optical unit 5b as a second preferred embodiment of the present invention, achieving lower angle dependency of the illuminating light that reaches the liquid crystal display panel 2.

The optical unit 5b is equipped with the prism-equipped diffusing plate 6, the first prism-equipped light collecting sheet 7, identical to those of the optical unit 5a (FIG. 2), and a prism-equipped collecting sheet 12 (a light diffracting component) and a second prism-equipped optical sheet 13 (a second light collecting component) between the collecting sheet 7 and the liquid crystal display panel 2 (FIG. 1).

Figure 7:
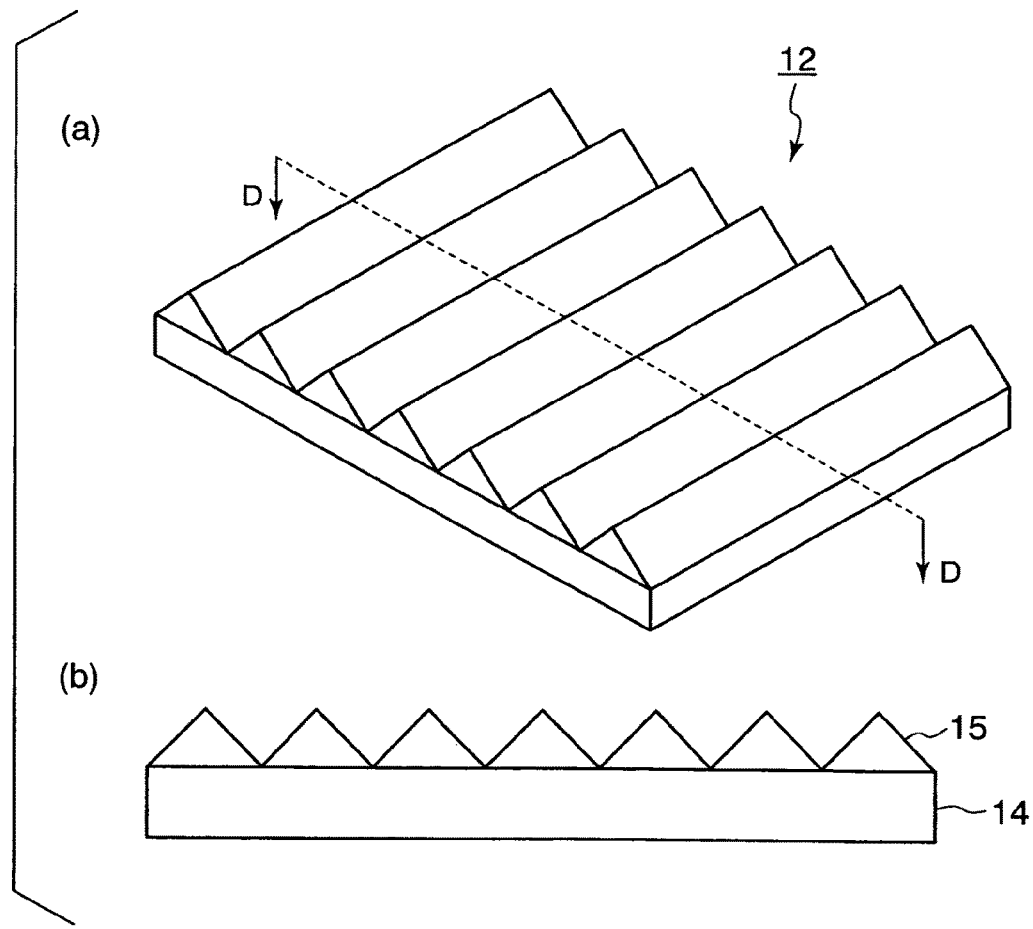
FIG. 7 shows a prism-equipped light collecting sheet used in an optical unit according to the present invention, in which (a) shows a partial plan view of the collecting sheet and (b) shows a partial sectional view of the collecting sheet, taken on line D-D in (a)

As shown in (a) and (b) of FIG. 7, the prism-equipped light collecting sheet 12 has multiple prisms 15 that are formed as being parallel to one another with a constant interval for their summits and protruding from the light-emitting side of a sheet base 14. Each prism 15 has a section like the teeth of a saw. The prisms 15 have triangles at their sections, as shown in (b) of FIG. 7, taken on line D-D shown in (a) of FIG. 7. Moreover, the prisms 15 are formed such that the triangles are continuously provided on the sheet base 14 as forming a V-shaped bottom between adjoining triangles with no gaps therebetween.

The light beams incident on the prism-equipped light collecting sheet 12 are collected by the sheet 12 in the direction orthogonal to the sheet 12 while being diffracted by the prisms 15.

As for such a light collecting function, the prism-equipped light collecting sheet 12 is made of a material that exhibits high transmittance because it requires to allow light to pass therethrough, like the microlens-equipped optical sheet 7, as shown in FIG. 4.

Moreover, the sheet base 14 and the prisms 15 formed on the base 14 are preferably made of the same material so that no reflection can occur due to the difference in reflective index at their interface, which otherwise occurs if different materials are used.

The second microlens-equipped optical sheet 13 has a similar configuration to the first microlens-equipped optical sheet 7 shown in FIG. 4, with microlens which may have different sizes and arrangements for prevention of a moiré pattern.

The illuminating light emitted from the second prism-equipped optical sheet 13 in the direction towards the liquid crystal display panel 2 are more diffused than the illuminating light incident on the prism-equipped light collecting sheet 12 from the light sources 3.

With the optical mechanism described above, the optical unit 5b of the second embodiment achieves lower luminance non-uniformity than the optical unit 5a of the first embodiment.

[Third Embodiment of Optical Unit]

Figure 8:
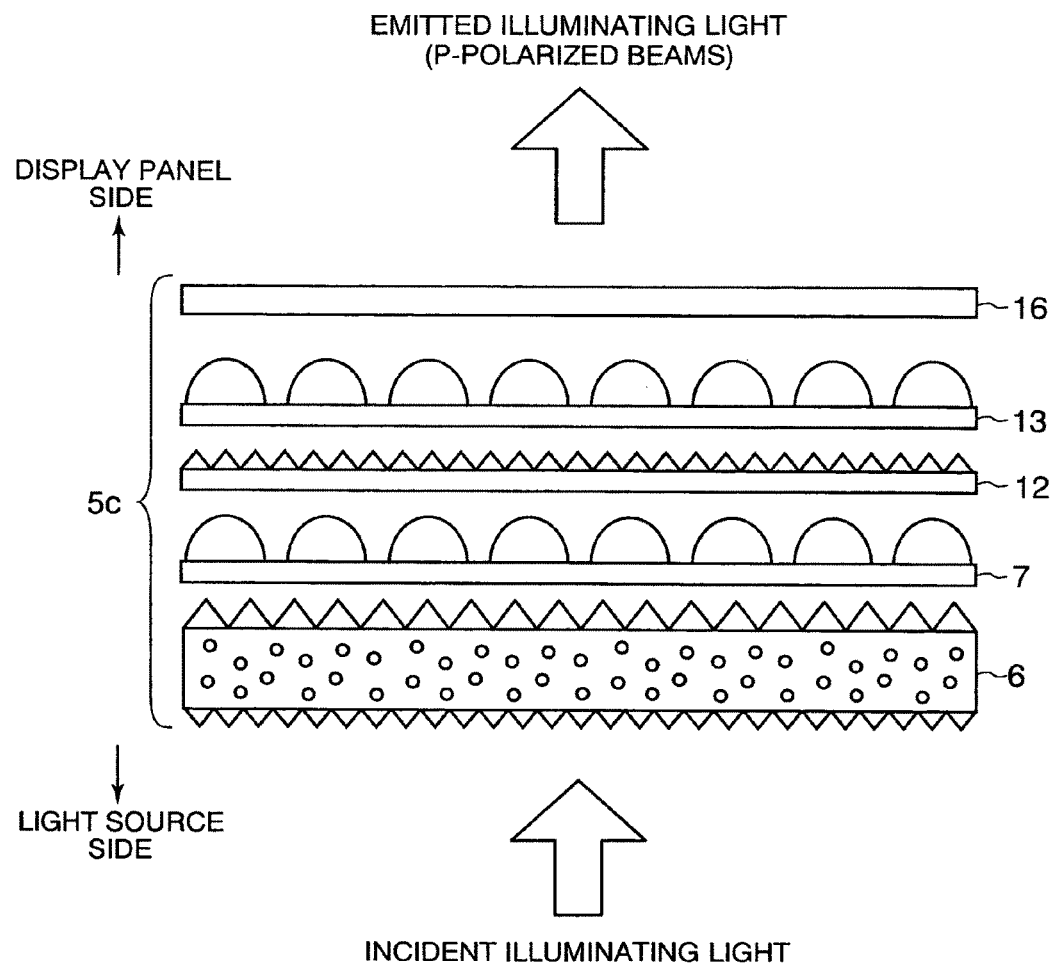
FIG. 8 shows an exploded sectional view of a third embodiment of an optical unit according to the present invention.

Described with reference to FIG. 8 is an optical unit 5c as a third preferred embodiment of the present invention.

The optical unit 5c is equipped with the prism-equipped diffusing plate 6, the first prism-equipped light collecting sheet 7, the prism-equipped collecting sheet 12, the second prism-equipped optical sheet 13, identical to those of the optical unit 5b (FIG. 6), and a polarization splitting sheet 16 (a polarization splitting component) between the optical sheet 13 and the liquid crystal display panel 2 (FIG. 1).

Due to the polarization films attached to the liquid crystal display panel 2 on both light-incident and -emitting sides, the optical unit 5b of the second embodiment could suffer reduced luminance. This is because the polarization films provided on the light-incident and -emitting sides of the display panel 2 allow a first linearly polarized light (P-polarized light, for example) to pass therethrough whereas absorbs a second linearly polarized light (S-polarized light, for example) that is orthogonal to the first linearly polarized light.

To overcome such a problem, the optical unit 5c of the third embodiment is provided with the polarization splitting sheet 16 to give higher luminance to the illuminating light that passes through the liquid crystal display panel 2.

For that purpose, the polarization splitting sheet 16 exhibits the light interference property to selectively reflect linearly polarized light (S-polarized light, for example) of the illuminating light, which polarized light is absorbed by the polarization film attached to the liquid crystal display panel 2 on the light-incident side.

When the illuminating light emitted from the second microlens-equipped optical sheet 13, as described with reference to FIG. 6, is incident on the polarization splitting sheet 16, the usable P-polarized light is allowed to pass through the splitting sheet 16 and reaches the liquid crystal display panel 2 whereas unusable S-polarized light is reflected by the splitting sheet 16 in the direction of the light sources 3 (FIG. 1).

The S-polarized light reflected in the direction of the light sources 3 is reflected further by the reflecting plate 4 so that its direction of polarization is changed. The light reflected by the reflecting plate 4 is diffused by the optical components of the optical unit 5c (the third embodiment) identical to those of the optical unit 5b (the second embodiment) and then incident on the polarization splitting sheet 16 again, the P-polarized light of the incident light being allowed to pass therethough to reach the liquid crystal display panel 2.

Thanks to the function of the polarization splitting sheet 16 described above, almost the entire illuminating light emitted from the light sources 3 are allowed to pass through the splitting sheet 16 as the P-polarized light usable for the liquid crystal display panel 2, thus achieving higher light utility and also higher luminance without respect to the angle of viewing (or with almost no angle dependency).

[Embodiment of Backlight Device]

Figure 9:
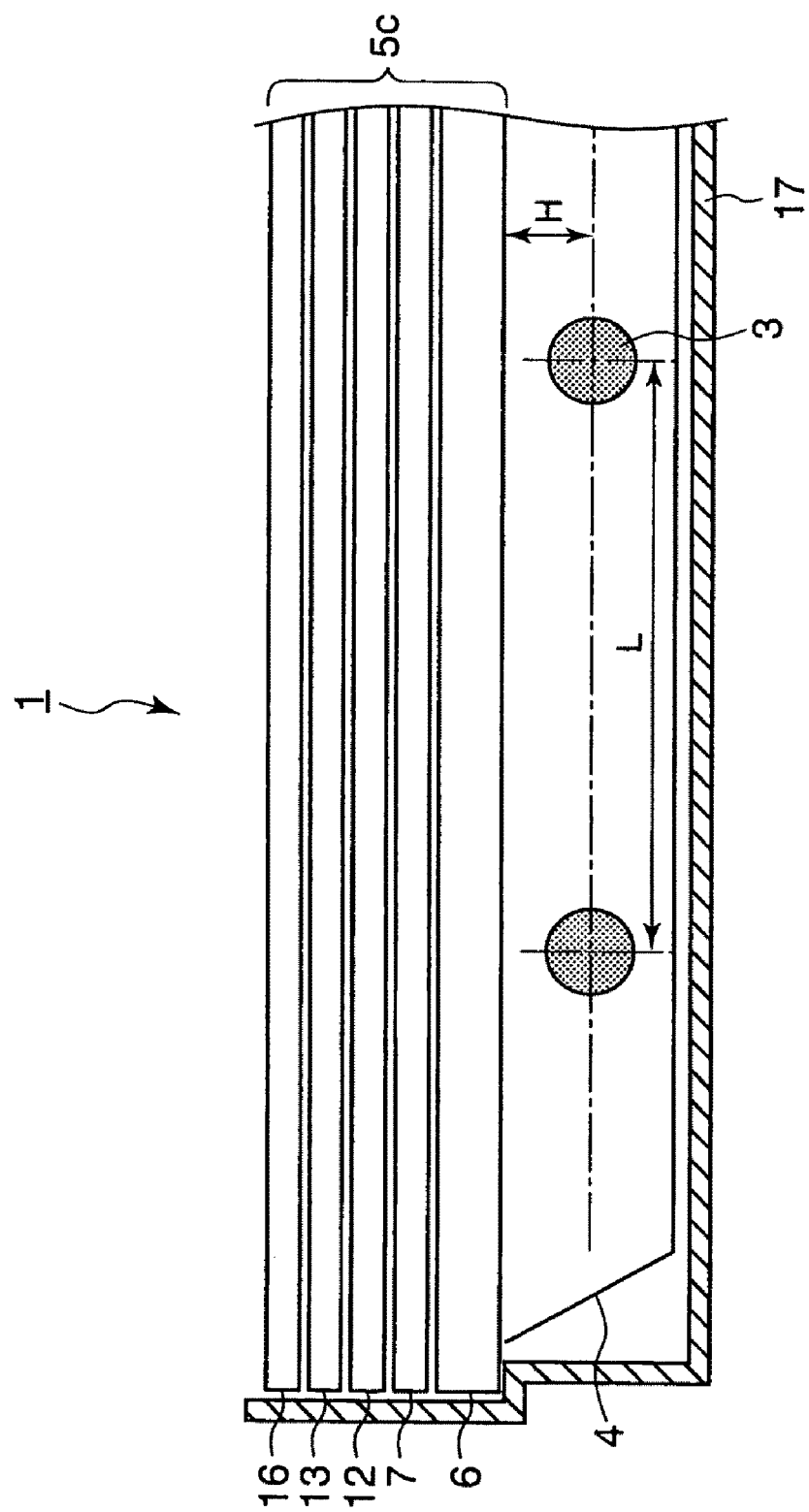
FIG. 9 shows a partial sectional view of a backlight device employing the optical unit shown in FIG. 8, according to the present invention.

Described next is a preferred embodiment of a backlight device 1 equipped with the optical unit 5c (FIG. 8), with reference to FIG. 9 showing a partial sectional view of the backlight device 1.

In FIG. 9, the backlight device 1 having a flat rectangular shape is equipped with: the tube-like light sources 3; the optical unit 5c that achieves higher optical performance for the illuminating light emitted from the light sources 3, with reduced luminance non-uniformity; the reflecting plate 4 that reflects light beams of the illuminating light emitted from the light sources 3, that are emitted in a direction opposite to the optical unit 5c, to make the light beams return to the unit 5c; and the metal sheet 17 that supports the light sources 3, the reflecting plate 4 and the optical unit 5c.

Provided in the backlight device 1 as each tube-like light source 3 is a cold cathode fluorescent lamp that is a compact fluorescent lamp with a small diameter of about 3 mm.

The light sources 3 are separated from one another by 24 mm in distance L, each having 5 mm in optical-unit distance H from its center to the bottom surface of the optical unit 5c.

The reflecting plate 4 has a white front face with a flat surface that faces the light sources 3 and side faces formed as being inclined to the optical unit 5c to guide light beams emitted in the lateral direction from the light sources 3 to the optical unit 5c.

As described with reference to FIG. 8, the optical unit 5c is equipped with the prism-equipped diffusing plate 6, the first microlens-equipped optical sheet 7, the prism-equipped light collecting sheet 12, the second microlens-equipped optical sheet 13, and the polarization splitting sheet 16, laminated in this order.

The prism-equipped diffusing plate 6 used in the backlight device 1 has a thickness of 2 mm, with the first prism section 8 having a vertical angle of 110 degrees at a pitch of 75 μm therebetween and the second prism section 9 having a vertical angle of 130 degrees at a pitch of 50 μm therebetween. The prisms of each of the first and second prism sections 8 and 9 of the diffusing plate 6 shown in FIG. 3 are aligned as parallel to the tube-like light sources 3 (in the direction perpendicular to the sheet of FIG. 9) in the direction of the length of each prism.

The first and second microlens-equipped optical sheets 7 and 13 used in the backlight device 1 have multiple microlenses, like shown in FIG. 5, with a thickness of 200 μm, a diameter in the range from 40 to 80 μm, and a height in the range from 20 to 40 μm.

The prism-equipped light collecting sheet 12 used in the backlight device 1 has a thickness of 280 μmm, with multiple prisms having a vertical angle of 90 degrees at a pitch of 50 μm therebetween. The prisms of the light collecting sheet 12 shown in FIG. 7 are aligned as parallel to the tube-like light sources 3 (in the direction perpendicular to the sheet of FIG. 9) in the direction of the length of each prism.

Discussed next with reference to FIGS. 10 to 13 are an evaluation method for the backlight device 1 on angular dependency of luminance and results of the evaluation.

The angular dependency of luminance was examined only on the plane of the backlight device 1 cut in the transversal direction (the lateral direction in the sheet of FIG. 10) orthogonal to the cross section of the tube-like light sources 3, not on the plane in the longitudinal direction parallel to the cross section of the light sources 3 due to almost no effects of the luminance non-uniformity in this direction, because of the direction of the length of each prism of the prism-equipped diffusing plate 6 and the prism-equipped light collecting sheet 12.

Figure 10:
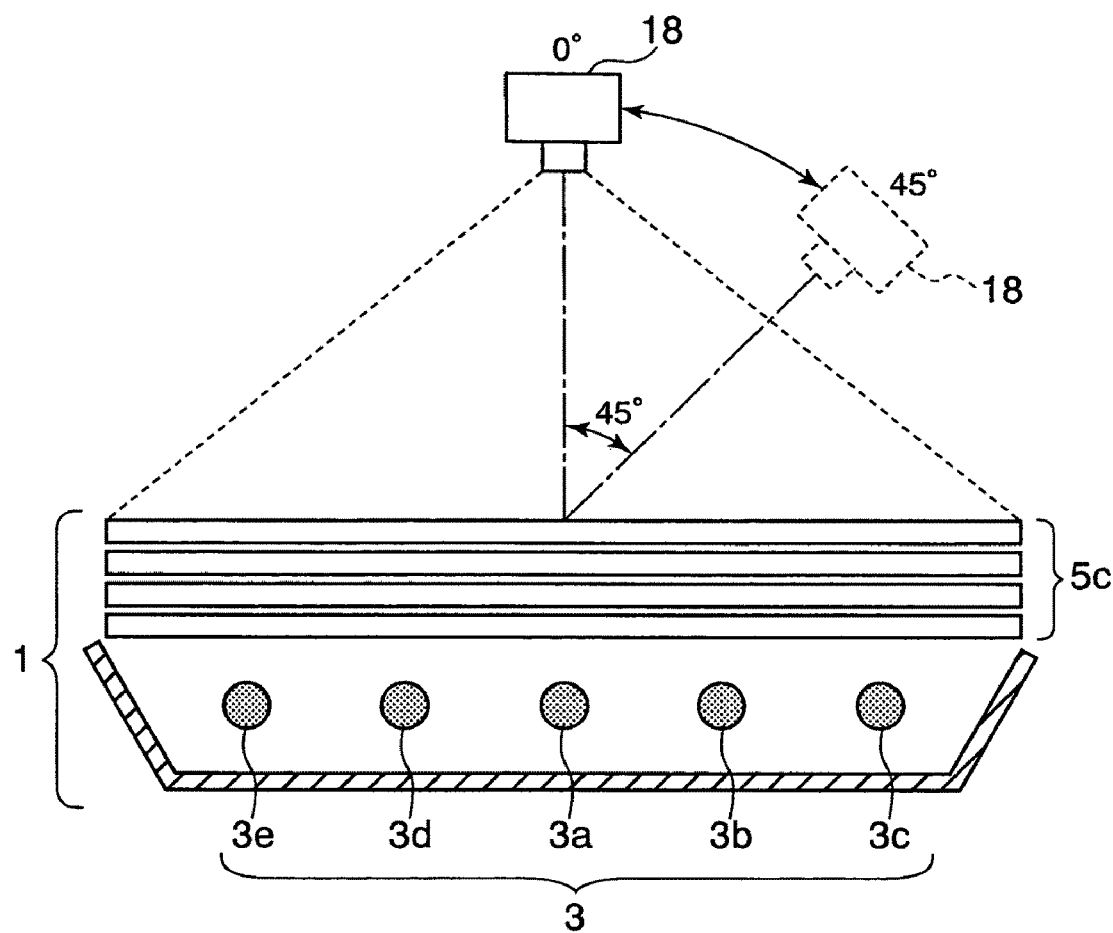
FIG. 10 shows a view illustrating examination of angular dependence of luminance in the backlight device shown in FIG. 9, according to the present invention.

FIG. 10 illustrates examination of the angular dependency of luminance.

In FIG. 10, a two-dimensional luminance colorimeter 18 was set in front of the optical unit 5c of the backlight device 1a, with an angle of 0 degrees at which the luminance colorimeter 18 was positioned as orthogonal to the light-emitting plane of the backlight device 1.

The angular dependency of luminance was examined with the two-dimensional luminance colorimeter 18 positioned at an angle of 0 degrees and also at an angle of 45 degrees inclined in the transversal direction of the backlight device 1.

The two-dimensional luminance colorimeter 18 is an instrument to two-dimensionally examine luminance non-uniformity, chromaticity, etc., on the plane to be examined for flat panel displays and backlight devices. The instrument used in the examination was a ProMetic 1400 made by Radiant Imaging Inc.

Figure 11:
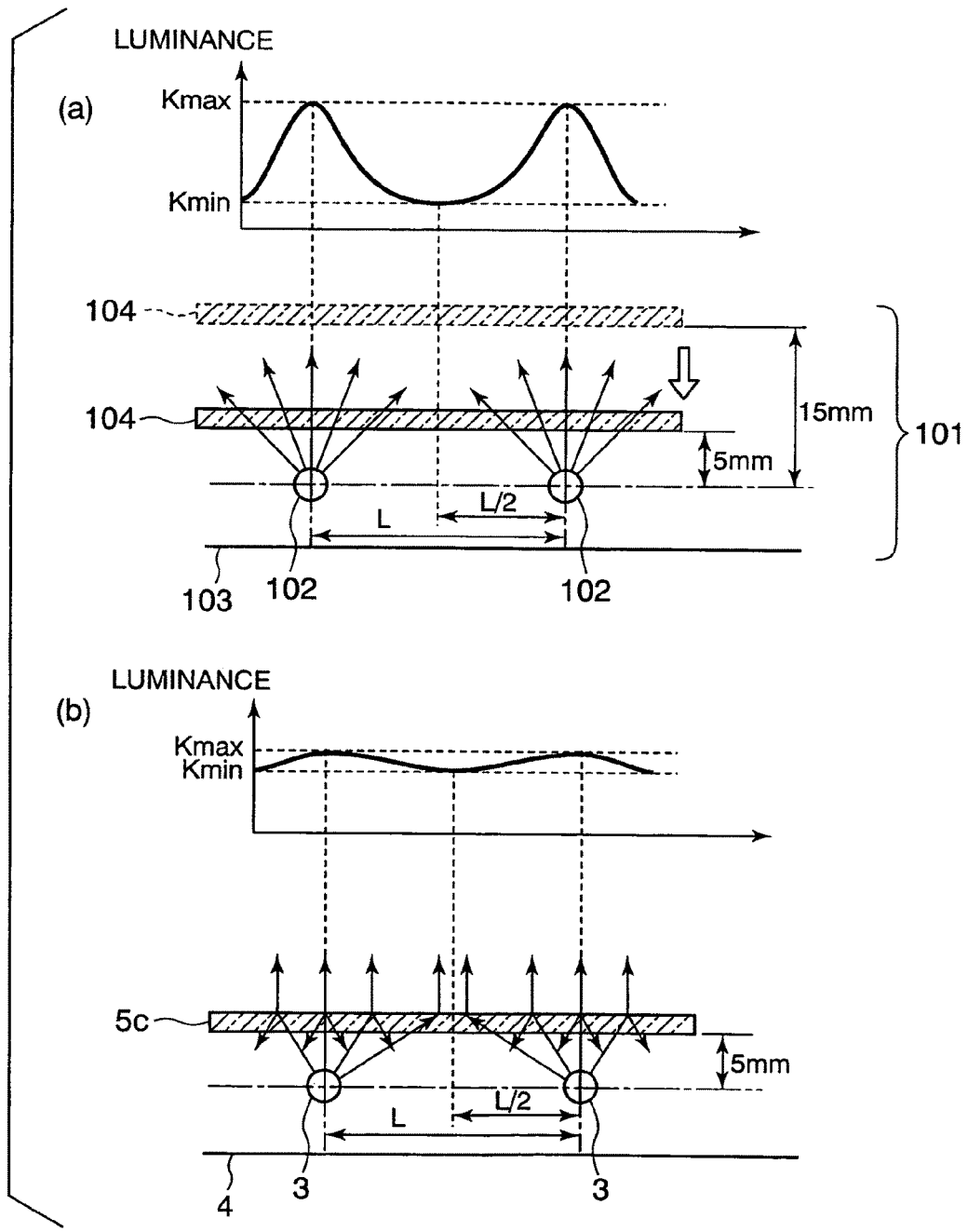
FIG. 11 shows views illustrating luminance non-uniformity, in which (a) and (b) illustrate luminance non-uniformity in a known backlight device and the backlight device shown in FIG. 9 of the present invention, respectively.

Also examined was the angular dependency of luminance in a known backlight device 101, shown in (a) of FIG. 11, equipped with an optical unit 104 having a diffusion plate, a first diffusion sheet, a light collecting sheet, and a second diffusion sheet, assembled as a thinner device with a modification to the optical-unit distance H from the known distance of 15 mm to 5 mm (the same as the backlight device 1 of the present invention).

The light sources 3 of the present invention and light sources 102 of the known backlight device 101 used in the evaluation were the same number of identical light sources with the same 24 mm in distance L.

Illustrated in (a) of FIG. 11 is the luminance measured in the known backlight device 101 at the angle of 0 degrees as shown in FIG. 10.

The backlight device 101 assembled as having the optical-unit distance H of 5 mm for the optical unit 104 closer to the light sources 102 than the known distance H of 15 mm exhibited a higher level of luminance non-uniformity (Kmax–Kmin), the difference between the maximum luminance Kmax and the minimum luminance Kmin of illuminating light emitted from the optical unit 104.

In the evaluation, the maximum luminance Kmax and the minimum luminance Kmin were measured at a first position just above (orthogonal to the center of) each light source 3 (102) and a second position corresponding to the middle position of 12 mm (L/2) between the adjoining light sources 3 (102), respectively.

Illustrated in (b) of FIG. 11 is the luminance measured in the backlight device 1 of the present invention at the angle of 0 degrees as shown in FIG. 10.

It is understood from FIG. 11 that, compared to the known backlight device 101, the backlight device 1 exhibited a lower level of luminance non-uniformity (Kmax–Kmin).

In detail, at the first position just above (orthogonal to the center of) each light source, the backlight device 1 of the present invention exhibited a lower luminance than the known backlight device 101, due to reflection, diffusion, etc.

In contrast, as the measured position was closer to the second position corresponding to the middle position of L/2 between the adjoining light sources, the backlight device 1 of the present invention enjoyed a higher light utility (incident light/emitted light) and hence a higher luminance than the known backlight device 101.

Figure 12:
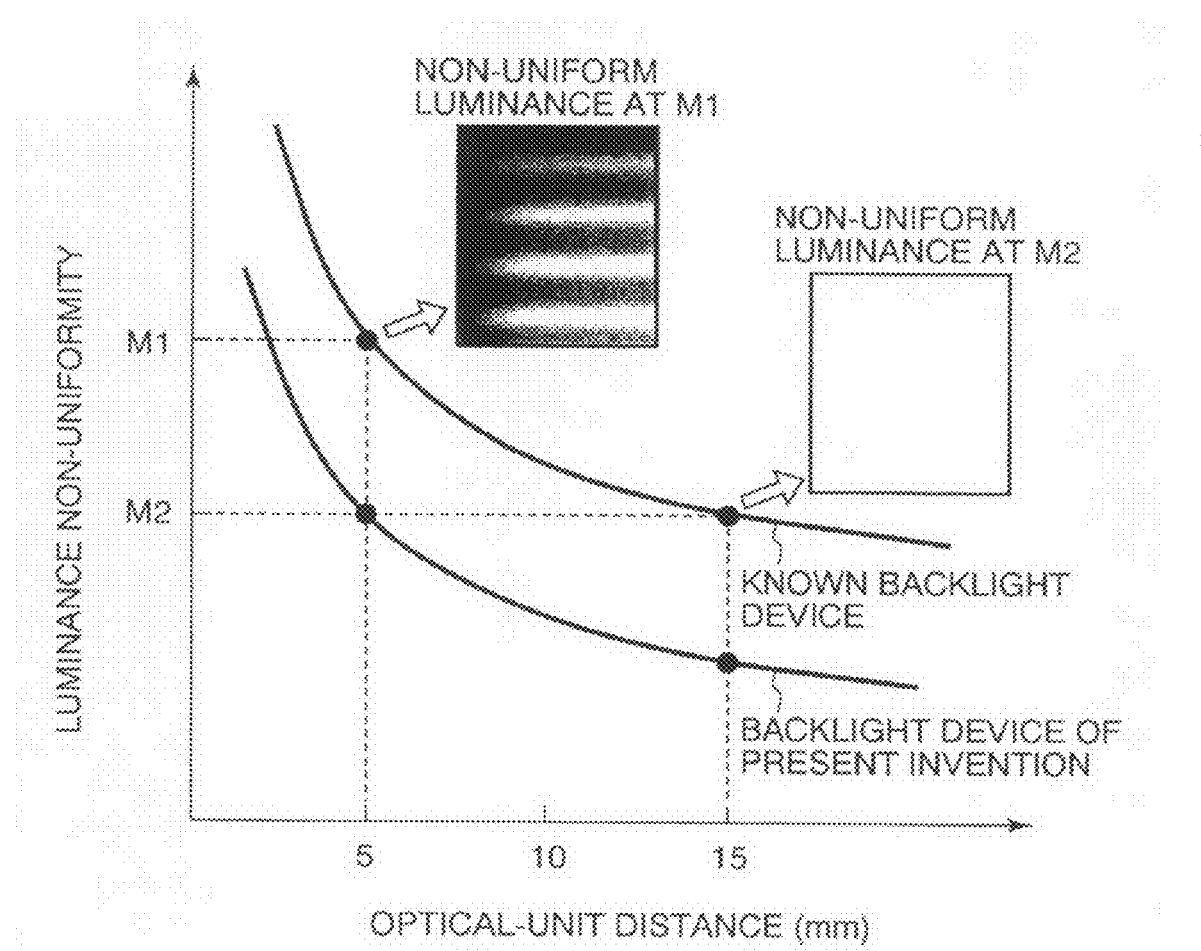
FIG. 12 shows a graph indicating luminance non-uniformity depending on an optical-unit distance in the known backlight device and the backlight device shown in FIG. 9 of the present invention.

Discussed further with reference to FIG. 12 is the luminance non-uniformity depending on the optical-unit distance H in the known backlight device 101 and the backlight device 1 of the present invention.

In the graph of FIG. 12, the ordinate indicates the optical-unit distance H and the abscissa indicates the luminance non-uniformity (Kmax−Kmin), the higher on the abscissa, the higher the level of luminance non-uniformity.

The graph of FIG. 12 shows that the known backlight device 101 and the backlight device 1 of the present invention exhibited almost the same lower level (M2) of luminance non-uniformity when the backlight devices 101 and 1 were adjusted to have the optical-unit distance H of 15 mm and 5 mm, respectively. However, the backlight device 101 exhibited a higher level (M1) of luminance non-uniformity when adjusted to have the optical-unit distance H of 5 mm.

In addition, photographs shown along the curves indicate constant distribution of luminance at the level M2 with a lower level of luminance non-uniformity whereas a stripe of black and white at the level M1 with a higher level of luminance non-uniformity, the white bright portions corresponding to the positions of the light sources 3 and 103.

Figure 13:
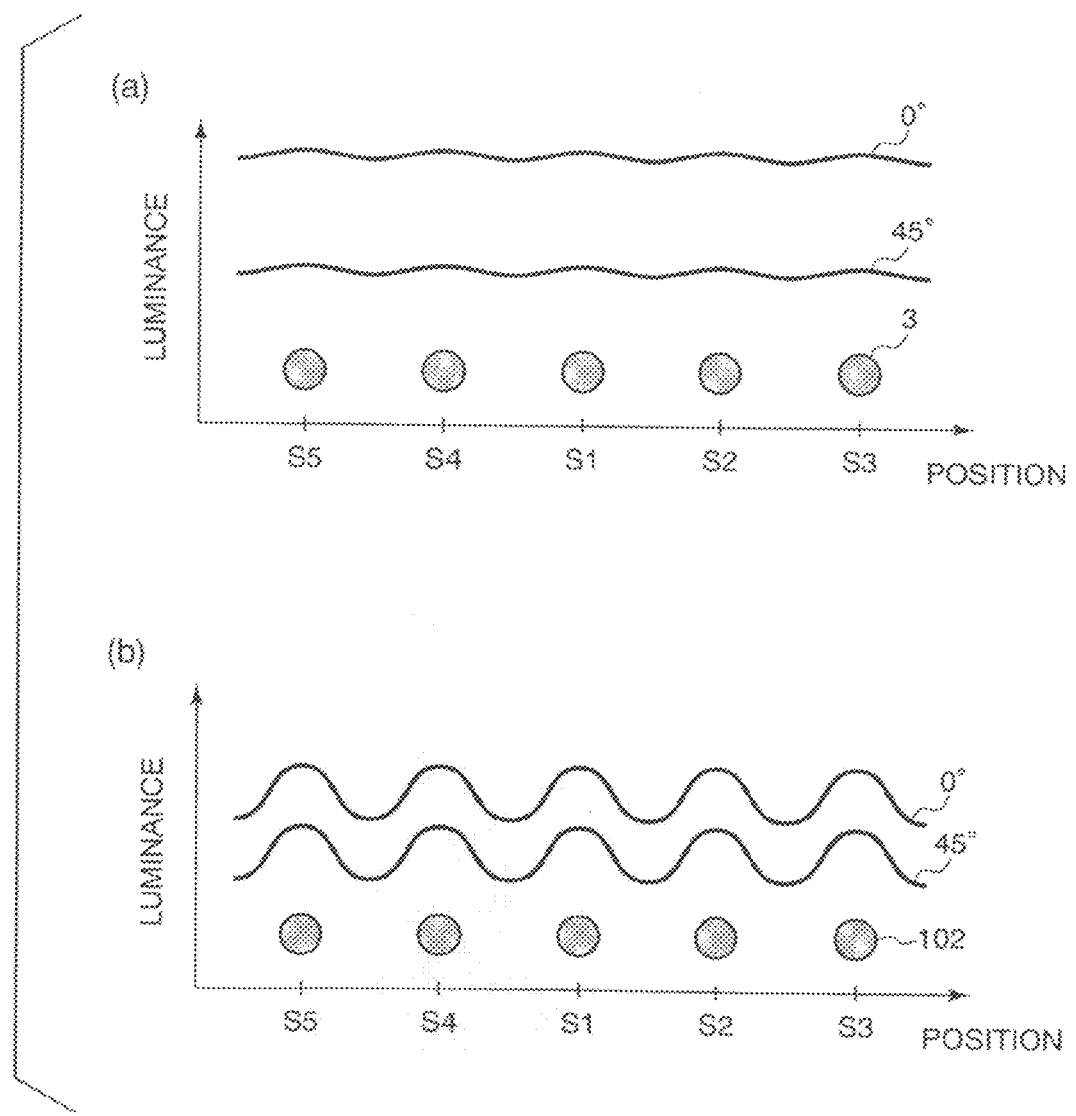
FIG. 13 shows graphs indicating angular dependency of luminance, in which (a) and (b) indicate angular dependency of luminance in the backlight device shown in FIG. 9 of the present invention and the known backlight device, respectively.

Discussed next with reference to FIG. 13 is the angular dependency of luminance.

Shown in (a) of FIG. 13 is the distribution of luminance measured by the two-dimensional luminance colorimeter 18 (FIG. 10) set in front of the backlight device 1 (with the optical-unit distance H of 5 mm) at the angles of 0 and 45 degrees.

Shown in (b) of FIG. 13 is the distribution of luminance measured by the two-dimensional luminance colorimeter 18 set in front of the known backlight device 101 (with the optical-unit distance H of 5 mm) at the angles of 0 and 45 degrees.

The ordinate in (a) of FIG. 13 indicates the positions of planes of the backlight device 1 cut in the transversal direction that is orthogonal to the light sources 3, with a point S1 corresponding to the position of a light source 3a with which the two-dimensional luminance colorimeter 18 faces at the angle of 0 degrees and points S2, S3, S4 and S5 corresponding to the positions of light sources 3b, 3c, 3d and 3e, respectively, shown in FIG. 10. The abscissa in (a) of FIG. 13 indicates luminance measured by the luminance colorimeter 18. The same is applied to the ordinate and abscissa in (b) of FIG. 13.

FIG. 13 teaches that: the backlight device 1 of the present invention exhibited a lower level of luminance non-uniformity at both of the angles of 0 and 45 degrees; whereas the known backlight device 101 exhibited a higher level of luminance non-uniformity at both of the angles of 0 and 45 degrees due to a shorter optical-unit distance H of 5 mm adjusted as same as the backlight device 1.

Described next is a liquid crystal module 19 equipped with the backlight device 1 having the optical unit 5c, the third embodiment of the present invention, with respect to FIG. 14 that is a perspective developed view of the liquid crystal module 19.

Figure 14:
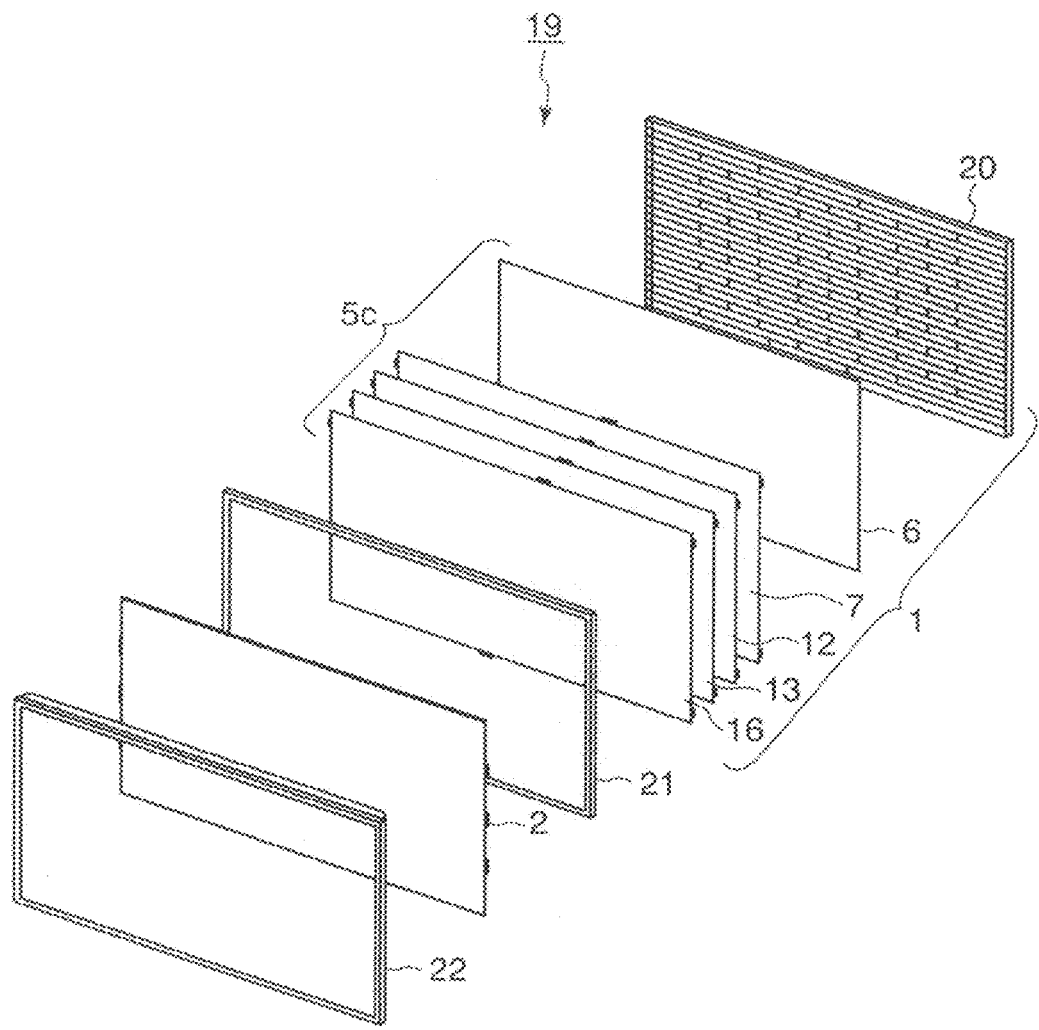
FIG. 14 shows a perspective developed view of a liquid crystal module employing the backlight device shown in FIG. 9, according to the present invention.

As shown in FIG. 14, the liquid crystal module 19 is constituted by: a backlight assembly 20 in which the light sources 3, the reflecting plate 4, and the metal sheet 17, such as shown in FIG. 1, are installed; the optical unit 5c (FIG. 8) attached to the backlight assembly 20; a panel chassis 21 to hold the optical unit 5c; the liquid crystal panel 2 (FIG. 1); and a front cover 22 by which the liquid crystal panel 2 is held, assembled in this order.

As shown in FIG. 14, the optical unit 5c is constituted by the prism-equipped diffusing plate 6, the first prism-equipped light collecting sheet 7, the prism-equipped collecting sheet 12, the second prism-equipped optical sheet 13, and the polarization splitting sheet 16, laminated in this order from the backlight assembly 20 side.

Instead of the optical unit 5c, the optical units 5a or 5b, the first or the second embodiment of the optical unit according to the present invention can be selectively employed in the liquid crystal module 19.

Figure 15:
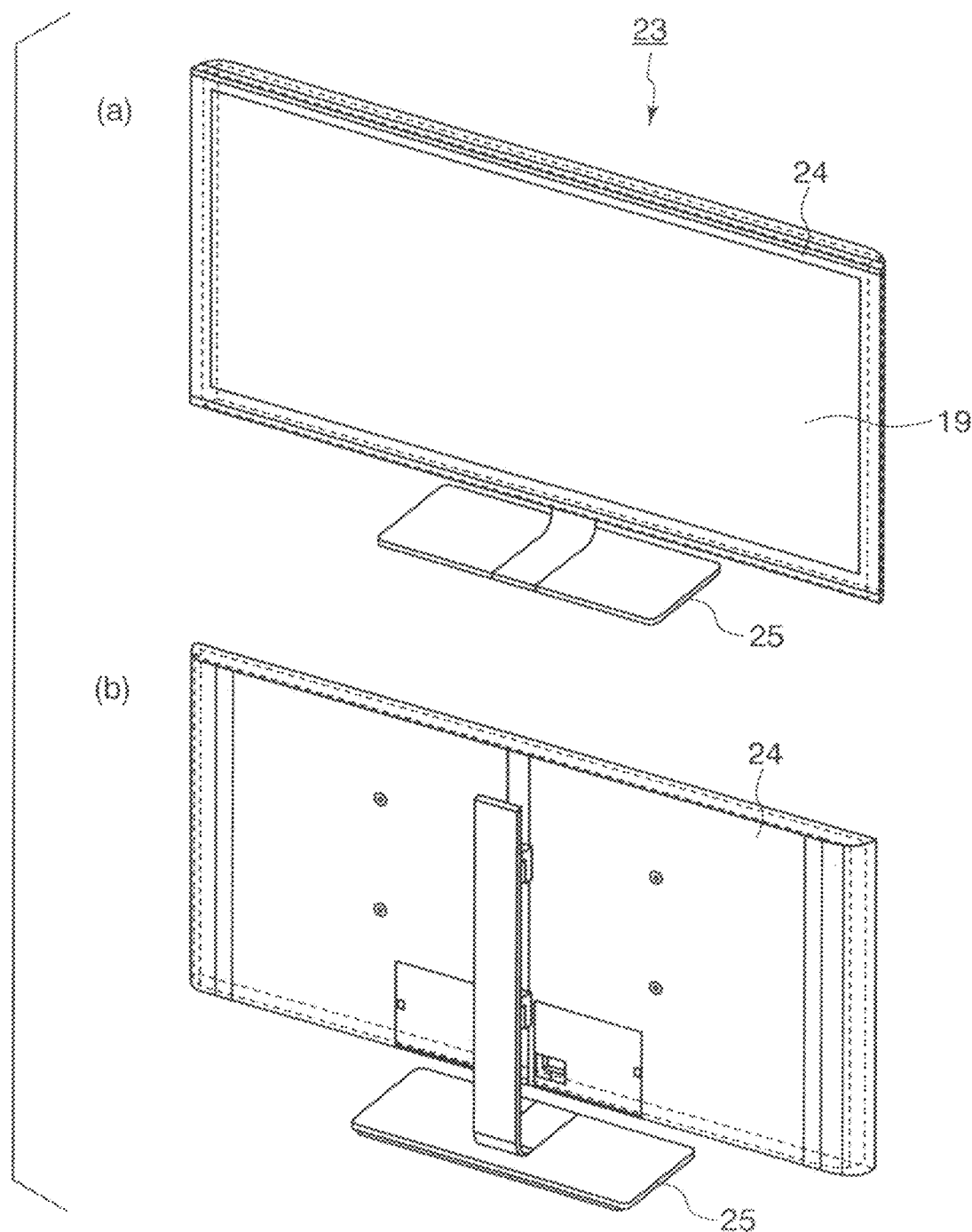
FIG. 15 shows views of a liquid crystal display apparatus employing the backlight device of the present invention, in which (a) and (b) show the front and rear sides, respectively, of the display apparatus.

FIG. 15 shows perspective views of a liquid crystal display apparatus 23 equipped with the backlight device 1 of the present invention, assembled with circuitry, such as a driver for the liquid crystal panel 2, input and output terminals (not shown), etc. The liquid crystal module 19 is installed in a housing 24 constituted by a front and a rear cover, that is supported by a mount 25.

Figure 16:
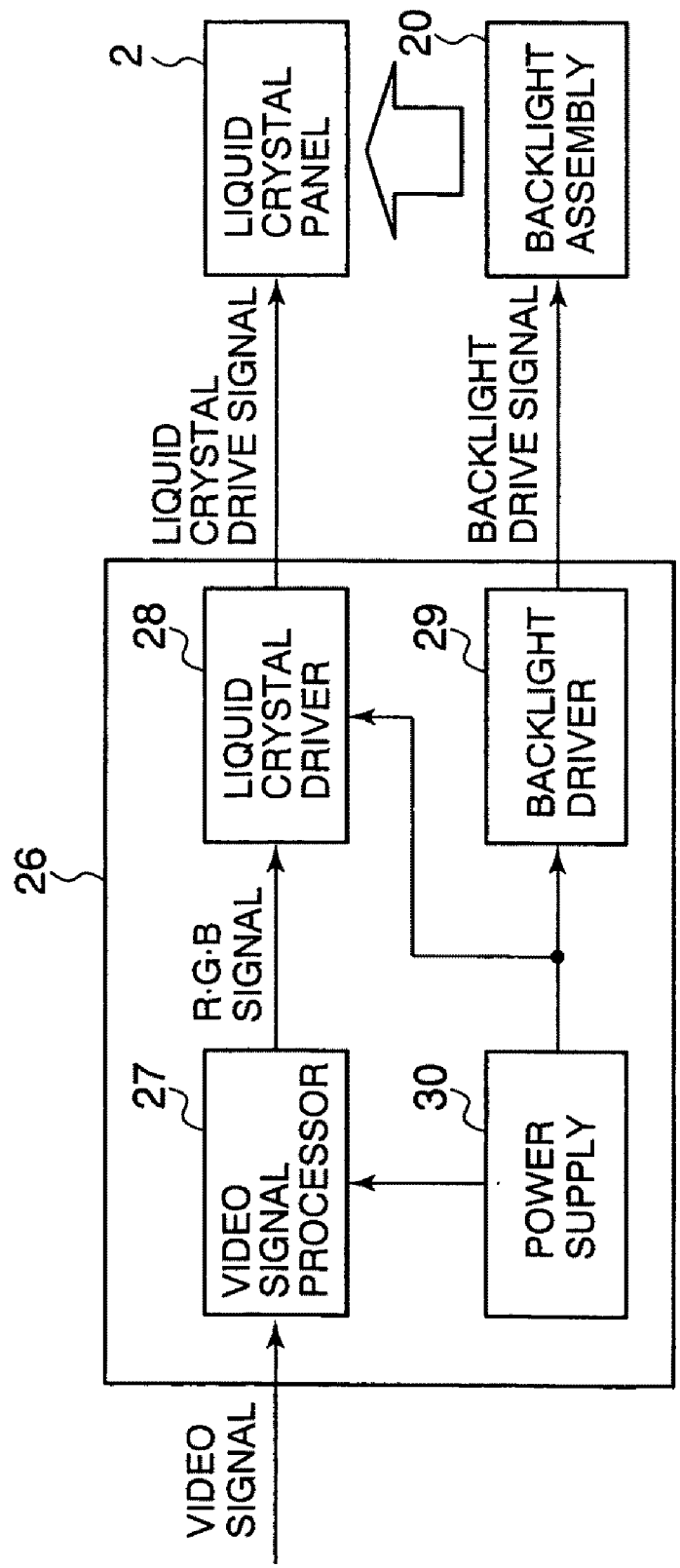
FIG. 16 shows a block diagram of the liquid crystal display apparatus shown in FIG. 15, according to the present invention.

Shown in FIG. 16 is a block diagram of a driver circuit 26 to be used for the liquid crystal display apparatus 23, equipped with a video signal processor 27, a liquid crystal driver 28, a backlight driver 29, and a power supply 30.

The power supply 30 supplies power to the video signal processor 27, the liquid crystal driver 28, and the backlight driver 29.

The video signal processor 27 receives a video signal supplied from external circuitry, such as a tuner, and processes the video signal to generate R, G and B signals that carry video data to be displayed on the liquid crystal display panel 2.

The liquid crystal driver 28 is equipped with a source driver, a gate driver, a timing controller, etc., although not shown in FIG. 16 for brevity.

When the R, G and B signals are supplied to the liquid crystal driver 28, the driver 28 supplies a liquid crystal drive signal to the liquid crystal display panel 2, based on the R, G and B signals, to drive the liquid crystal with a specific voltage per pixel.

When the backlight device 1 employs a cold cathode fluorescent lamp for each light source 3 (FIG. 1), the backlight driver 29 converts a power supply voltage supplied by the power supply 30 into an alternating voltage, with an inverter installed in the driver 29, and supplies the alternating voltage to the backlight device 1, as a backlight drive signal.

As described in detail, the present invention achieves a lower level of luminance non-uniformity with almost no lowered luminance for a large-size liquid crystal display apparatus.

Moreover, the present invention achieves a lower level of luminance non-uniformity with almost no lowered luminance for a thin liquid crystal display apparatus with the optical-unit distance H of 5 mm (shorter than the known distance H of 15 mm) between a tube-like light sources and an optical unit, with no increase of the number of the light sources.

Furthermore, the present invention achieves a lower level of luminance non-uniformity in the direction orthogonal to a backlight device and also oblique directions.

Moreover, the present invention does not need to increase in the number of the tube-like light sources which leads to no needs to increase in the number of inverters in a backlight driver, thus achieving low power consumption and high cost performance.

What is claimed is:

1. An optical unit for use in a backlight device of a liquid crystal display apparatus, comprising:
   a light-diffusing component to diffract incident light; and
   a first light-collecting component having a plurality of microlenses each having a shape of a hemisphere- or semi-oval-like protrusion on a light-emitting side of the first light-collecting component, wherein the light-diffusing component and the first light-collecting component are provided in this order on an optical path of light emitted from a light source of the backlight device, and the light-diffusing component includes:

a light-diffusing section having a first surface that faces the light source and an opposite second surface, the light-diffusing section being made of a material that is a transparent resin with a light-diffusing agent dispersed in the resin or a mixture of at least two types of resin which are hardly mixed with each other;

a first prism section provided on the first surface, having a plurality of prisms each having a cross section like teeth of a saw and a summit protruding towards the light source;

a second prism section provided on the second surface, having a plurality of prisms each having a cross section like teeth of a saw and a summit protruding in an opposite direction of each prism of the first prism section, a light-diffracting component having a plurality of prisms provided on a light-emitting side of the light-diffracting component, each prism of the light-diffracting component having a cross section like teeth of a saw and a summit protruding in the opposite direction of each prism of the first prism section; and a second light-collecting component having a plurality of microlenses each having a shape of a hemisphere- or semi-oval-like protrusion on a light-emitting side of the second light-collecting component, wherein the light-diffusing section, the first prism section, and the second prism section are arranged in a manner that the light emitted from the light source is incident on the first prism section and diffracted in a direction orthogonal to a slope of each prism of the first prism section, the light diffracted by the first prism section is diffused inside the light diffusing section, and among beams diffused inside the light-diffusing section, beams incident on the second prism section at a specific angle are diffracted in a direction orthogonal to the light-diffusing section whereas other beams incident on the second prism section at angles different from the specific angle are reflected by the second prism section, and wherein the light-diffracting component and the second light-collecting component are provided in this order on an optical path of light emitted from the first light-collecting component.

2. The optical unit according to claim 1 further comprising a polarization splitting component on an optical path of light emitted from the second light-collecting component, the polarization splitting component splitting incident light into a first linearly polarized light and a second linearly polarized light that is orthogonal to the first linearly polarized light, the first linearly polarized light being allowed to pass through the polarization splitting component, the second linearly polarized light being reflected by the polarization splitting component.

* * * * *